United States Patent
Choi et al.

(10) Patent No.: US 10,108,345 B2
(45) Date of Patent: Oct. 23, 2018

(54) VICTIM STREAM SELECTION ALGORITHMS IN THE MULTI-STREAM SCHEME

(71) Applicant: Samsung Electronics Co., Ltd., Suwon-si, Gyeonggi-do (KR)

(72) Inventors: Changho Choi, San Jose, CA (US); Truong Nguyen, Los Altos, CA (US); Wentao Wu, Milpitas, CA (US)

(73) Assignee: SAMSUNG ELECTRONICS CO., LTD. (KR)

( * ) Notice: Subject to any disclaimer, the term of this patent is extended or adjusted under 35 U.S.C. 154(b) by 34 days.

(21) Appl. No.: 15/400,750

(22) Filed: Jan. 6, 2017

(65) Prior Publication Data
US 2018/0121090 A1    May 3, 2018

Related U.S. Application Data

(60) Provisional application No. 62/416,563, filed on Nov. 2, 2016.

(51) Int. Cl.
    *G06F 3/06* (2006.01)
(52) U.S. Cl.
    CPC ............ *G06F 3/061* (2013.01); *G06F 3/0616* (2013.01); *G06F 3/0655* (2013.01); *G06F 3/0679* (2013.01)
(58) Field of Classification Search
    CPC ...... G06F 3/061; G06F 3/0613; G06F 3/0616; G06F 3/0655; G06F 3/0656; G06F 3/0679; G06F 9/3851; G06F 17/30516

USPC ..................................... 710/21, 74; 711/103
See application file for complete search history.

(56) References Cited

U.S. PATENT DOCUMENTS

| | | | |
|---|---|---|---|
| 7,257,814 B1* | 8/2007 | Melvin ................ | G06F 9/3004 710/200 |
| 8,060,637 B2 | 11/2011 | Kayanuma et al. | |
| 8,347,039 B2 | 1/2013 | Boyle et al. | |
| 8,522,292 B2 | 8/2013 | Laughlin | |
| 9,154,834 B2 | 10/2015 | Erickson | |
| 9,184,998 B2 | 11/2015 | Xue | |
| 9,237,383 B2 | 1/2016 | Negroponte | |
| 2008/0294802 A1 | 11/2008 | Kohinata et al. | |
| 2012/0072798 A1 | 3/2012 | Unesaki et al. | |
| 2012/0254524 A1 | 10/2012 | Fujimoto | |
| 2015/0134626 A1 | 5/2015 | Theimer et al. | |
| 2016/0036704 A1* | 2/2016 | Xiao .................. | H04L 47/2416 370/237 |
| 2016/0266792 A1 | 9/2016 | Amaki et al. | |
| 2016/0283125 A1 | 9/2016 | Hashimoto et al. | |
| 2016/0313943 A1 | 10/2016 | Hashimoto et al. | |
| 2017/0153848 A1* | 6/2017 | Martineau ............... | G06F 3/061 |
| 2017/0272494 A1* | 9/2017 | Huen ...................... | H04L 65/80 |

* cited by examiner

*Primary Examiner* — Gary J Portka
(74) *Attorney, Agent, or Firm* — Innovation Counsel LLP

(57) ABSTRACT

A method includes: collecting a stream attribute associated with each of a plurality of streams to a non-volatile memory; storing the stream attribute in a repository; and selecting a victim stream among the plurality of streams based on the stream attribute. The stream attribute can be one or more of a time stamp, an updated frequency, and an amount of data written to each of the plurality of streams.

17 Claims, 4 Drawing Sheets

| | Timestamp |
|---|---|
| Stream 1 | 7 |
| Stream 2 | 6 |
| Stream 3 | 4 |
| Stream 4 | 3 |
| Stream 5 | 5 |

FIG. 4A

| | Frequency |
|---|---|
| Stream 1 | 10 |
| Stream 2 | 5 |
| Stream 3 | 15 |
| Stream 4 | 8 |
| Stream 5 | 20 |

FIG. 4B

| | Amount of data written to the stream (MB) |
|---|---|
| Stream 1 | 95 |
| Stream 2 | 50 |
| Stream 3 | 10 |
| Stream 4 | 95.5 |
| Stream 5 | 30 |

FIG. 4C

VICTIM STREAM SELECTION ALGORITHMS IN THE MULTI-STREAM SCHEME

CROSS-REFERENCE TO RELATED APPLICATION(S)

This application claims the benefits of and priority to U.S. Provisional Patent Application Ser. No. 62/416,563 filed Nov. 2, 2016, the disclosure of which is incorporated herein by reference in its entirety.

TECHNICAL FIELD

The present disclosure relates generally to a non-volatile memory, more particularly, to a system and method for selecting a victim stream among a plurality of streams to access a non-volatile memory.

BACKGROUND

A multi-stream storage device is capable of processing data in multiple streams. For example, data access to the multi-stream storage device can be separated in multiple streams, and data in each stream can be written together. Data that are logically associated or that have a similar lifetime and/or an update frequency can be grouped together to improve the efficiency of the multi-stream storage device.

Various multi-stream schemes have been developed and employed to improve the performance and endurance of a solid-state drive (SSD). The number of streams that can be serviced at the same time is limited due to the limited resources available within the SSD such as a CPU and a memory. When a host (or a server) wants to use more streams than the supported number of streams, the host can close an open stream and open a new stream. Alternatively, the SSD itself can implicitly close an open stream, open a new stream, and service the data access request by the host in the new stream as needed. In response to the host's command to close a stream or when the SSD needs to implicitly close a stream, the SSD must determine which victim stream to close among the open streams.

SUMMARY

According to one embodiment, a method includes: collecting a stream attribute associated with each of a plurality of streams to a non-volatile memory; storing the stream attribute in a repository; and selecting a victim stream among the plurality of streams based on the stream attribute. The stream attribute can be one or more of a time stamp, an updated frequency, and an amount of data written to each of the plurality of streams.

According to another embodiment, a memory system includes: a host; a non-volatile memory; a multi-stream interface configured to interface between the host and the non-volatile memory; and a victim-stream selection logic. The victim-stream selection logic is configured to: collect a stream attribute associated with each of a plurality of streams to the non-volatile memory; store the stream attribute in a repository; and select a victim stream among the plurality of streams based on the stream attribute.

The above and other preferred features, including various novel details of implementation and combination of events, will now be more particularly described with reference to the accompanying figures and pointed out in the claims. It will be understood that the particular systems and methods described herein are shown by way of illustration only and not as limitations. As will be understood by those skilled in the art, the principles and features described herein may be employed in various and numerous embodiments without departing from the scope of the present disclosure.

BRIEF DESCRIPTION OF THE DRAWINGS

The accompanying drawings, which are included as part of the present specification, illustrate the presently preferred embodiment and together with the general description given above and the detailed description of the preferred embodiment given below serve to explain and teach the principles described herein.

FIG. 4A is an example table of stream attributes including a time stamp, according to one embodiment;

FIG. 4B is an example table of stream attributes including an update frequency, according to one embodiment; and FIG. 4C is an example table of stream attributes including an amount of data written to a stream, according to one embodiment.

Figure 1:
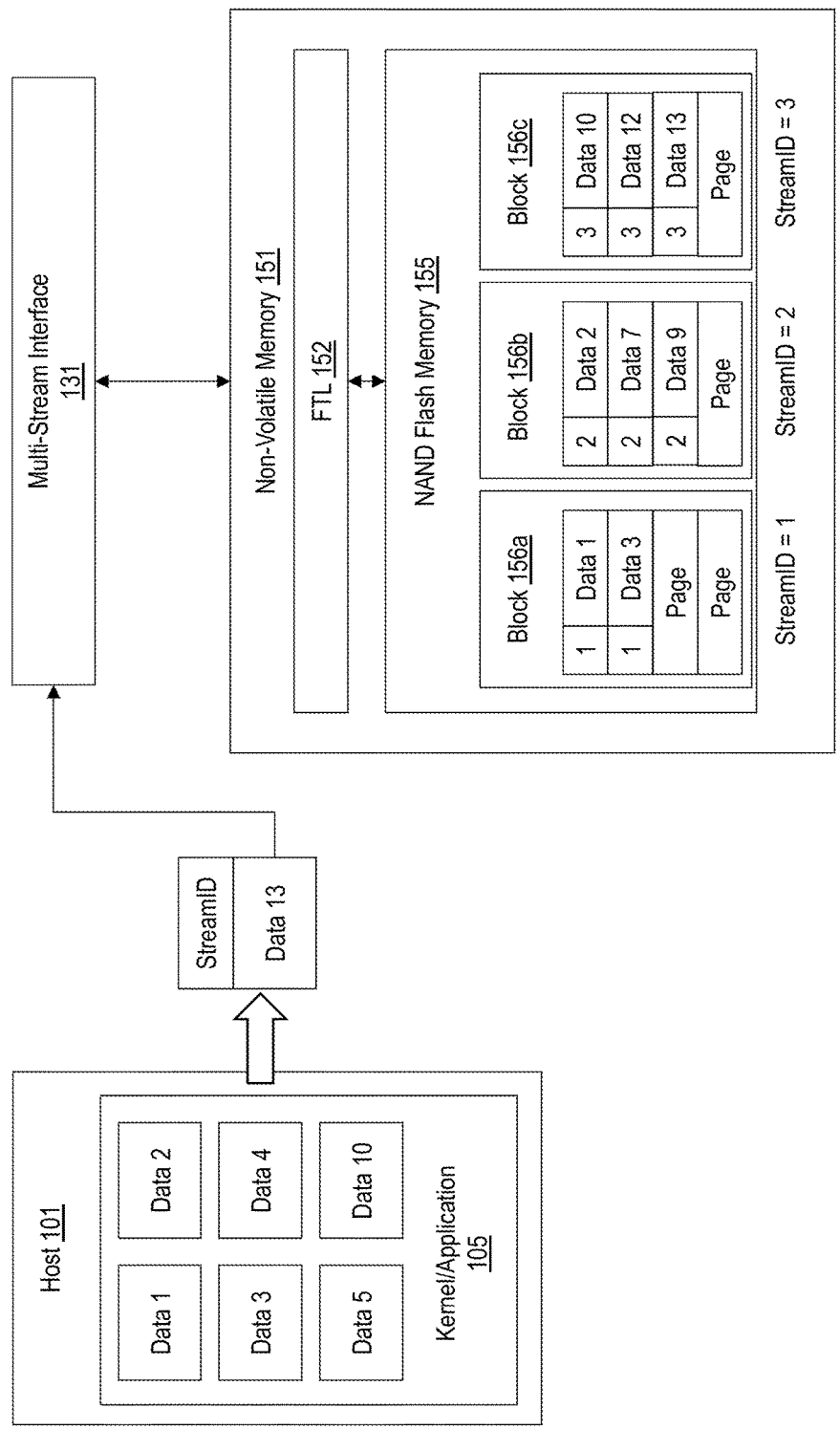
FIG. 1 shows an example multi-stream interface between a host and a non-volatile memory, according to one embodiment.

The figures are not necessarily drawn to scale and elements of similar structures or functions are generally represented by like reference numerals for illustrative purposes throughout the figures. The figures are only intended to facilitate the description of the various embodiments described herein. The figures do not describe every aspect of the teachings disclosed herein and do not limit the scope of the claims.

DETAILED DESCRIPTION

Each of the features and teachings disclosed herein can be utilized separately or in conjunction with other features and teachings to provide a system and method for selecting a victim stream among a plurality of streams to access a non-volatile memory. Representative examples utilizing many of these additional features and teachings, both separately and in combination, are described in further detail with reference to the attached figures. This detailed description is merely intended to teach a person of skill in the art further details for practicing aspects of the present teachings and is not intended to limit the scope of the claims. Therefore, combinations of features disclosed above in the detailed description may not be necessary to practice the teachings in the broadest sense, and are instead taught merely to describe particularly representative examples of the present teachings.

In the description below, for purposes of explanation only, specific nomenclature is set forth to provide a thorough understanding of the present disclosure. However, it will be apparent to one skilled in the art that these specific details are not required to practice the teachings of the present disclosure.

Some portions of the detailed descriptions herein are presented in terms of algorithms and symbolic representations of operations on data bits within a computer memory. These algorithmic descriptions and representations are used by those skilled in the data processing arts to effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the below discussion, it is appreciated that throughout the description, discussions utilizing terms such as "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms presented herein are not inherently related to any particular computer or other apparatus. Various general-purpose systems, computer servers, or personal computers may be used with programs in accordance with the teachings herein, or it may prove convenient to construct a more specialized apparatus to perform the required method steps. The required structure for a variety of these systems will appear from the description below. It will be appreciated that a variety of programming languages may be used to implement the teachings of the disclosure as described herein.

Moreover, the various features of the representative examples and the dependent claims may be combined in ways that are not specifically and explicitly enumerated in order to provide additional useful embodiments of the present teachings. It is also expressly noted that all value ranges or indications of groups of entities disclose every possible intermediate value or intermediate entity for the purpose of an original disclosure, as well as for the purpose of restricting the claimed subject matter. It is also expressly noted that the dimensions and the shapes of the components shown in the figures are designed to help to understand how the present teachings are practiced, but not intended to limit the dimensions and the shapes shown in the examples.

The present disclosure describes a multi-stream scheme including a scheme for selecting a candidate victim stream among a plurality of streams running for a non-volatile memory. In one embodiment, the present multi-stream can select one or more candidate victim streams among a plurality of open streams based on various attributes and selection criteria. Examples of the attributes that are used for selecting a victim stream include, but are not limited to, an oldest stream, a least frequently used stream, and a mostly filled stream. The victim-stream selection criteria can be selected based on a user-configuration.

The present multi-stream scheme can allow a host and a non-volatile memory to support a greater number of streams than one that a non-volatile memory can support by explicitly closing one or more streams and opening one or more new streams. In some embodiments, the present multi-stream scheme can support a flexible number for streams in the non-volatile memory depending on the operating conditions of the non-volatile memory or a user preference.

The present multi-stream scheme can provide for improved endurance and performance while maintaining the latency consistency of a non-volatile memory. The present multi-stream scheme allows a host to associate each write operation with a stream. All data associated with a stream is expected to be invalidated, for example, updated, trimmed, unmapped, and deallocated at or about the same time. Various data such as log data, metadata, database data, and multimedia data requested by the host can be aligned in the memory blocks of the non-volatile memory based on application data characteristics. An example of the application data characteristics is an update frequency.

FIG. 1 shows an example multi-stream interface between a host and a non-volatile memory, according to one embodiment. A host 101 is coupled to a non-volatile memory 151 via a multi-stream interface 131. The multi-stream interface 131 may be implemented as a logic in the host 101, in the non-volatile memory 151, or as an external logic depending on the configuration. The multi-stream interface 131 allows the host 101 to provide information about the characteristics of the data to be written to the non-volatile memory 151.

The host 101 includes a kernel or application 105. In one embodiment, the kernel/application 105 provides information to the non-volatile memory about the data update frequency via the multi-stream interface 131. The kernel/application 105 may group data into respective streams, and provide the update frequency for each of the streams. In the present example, Data 2 is a metadata, Data 1, Data 3, Data 4, and Data 5 are user data, and Data 10 and Data 13 are temporary data. Each data is associated with a stream identification (ID) number and is streamed to the non-volatile memory 151 in one of an open stream based on its stream ID. In one embodiment, data having the same or similar characteristics are streamed with the same stream ID.

The non-volatile memory 151 includes a flash translation layer (FTL) 152 and a NAND flash memory 155 including a plurality of memory blocks 156a, 156b, and 156c. Although the present example illustrates one NAND flash memory 155 and three memory blocks 156a, 156b, and 156c, it is noted that the non-volatile memory 151 can include any type and number of flash memories, and each flash memory can include any number of memory blocks.

The multi-stream interface 131 can provide an informational path for the host 101 to allow the host 101 to provide information of the data written to the non-volatile memory 151. With the information received from the host 101, the non-volatile memory 151 can assign streams based on the characteristics of the data and efficiently place data in appropriate memory blocks 156 of the non-volatile memory 151 using the streams. For example, the non-volatile memory 151 can store data in the memory blocks 156 of the non-volatile memory 151 based on a lifetime of the data.

Because the hardware and system resources of the non-volatile memory 151 are limited, a limited number of streams can be supported simultaneously at a specific time. The host 101 can leverage the limited number of supported streams with explicit open and close stream commands as needed. For example, the non-volatile memory 151 can support N streams, and the host can use up to N streams to access the SSD at a specific time. In the present example where the non-volatile memory 151 includes the NAND flash memory 155, and the N streams can be used to perform read, program, and erase operations on the non-volatile memory 151. If the host 101 determines to use additional M (M being equal to or less than N) streams, the host 101 can explicitly close the equal number of streams (M streams) among the N open streams. In this case, the host 101 employs a victim-stream selection logic and can explicitly select the M victim streams to close among the N open streams based on their stream IDs. The victim streams can be selected based on various attributes, for example, the time stamp, the update frequency, and the amount of data written to each of the streams as discussed further herein.

According to another embodiment, a victim stream can be selected by the non-volatile memory 151 based on the implicit request by the host 101. In this case, the host 101 can send a request to the non-volatile memory to close a certain number of streams without specifically instructing which streams to close. Alternatively, the host 101 can request to open a new stream beyond the capacity of the non-volatile memory, thereby implicitly requesting the non-volatile memory to close an existing stream. The non-volatile memory 151 can include the victim-stream selection logic and internally select victim streams to close.

According to one embodiment, the non-volatile memory 151 can map data using the streams and place data with the same or similar update frequency into the same memory block 156. For example, user data, metadata, and temporary data can have different update frequencies. The host 101 can stream the user data, the metadata, and the temporary data to the non-volatile memory 151 in respective open streams with different stream IDs. For example, Data 1 and Data 3 are user data, and they are placed in the memory block 156a using a stream ID 1. Data 2, Data 7, and Data 9 are metadata, and they are placed in the memory block 156b using a stream ID 2. Data 10, Data 12, and Data 13 are temporary data, and they are placed in the memory block 156c using a stream ID 3.

According to one embodiment, the host 101 and/or the non-volatile memory 151 can utilize various thresholds when selecting a victim stream. Examples of such thresholds include, but are not limited to, a time stamp threshold, a frequency threshold, and a usage threshold. The non-volatile memory can select the victim stream based on one or more thresholds at the last minute before closing any stream to reduce the system latency. For example, the non-volatile memory can set up a threshold (e.g., 4) of time stamp for victim-stream selection for closure. In this case, streams with a lower time stamp (e.g., 3) than the threshold can be implicitly closed through background operations during an idling time. The closure of victim streams based on a threshold can improve performance especially in low queue depth cases.

Figure 2:
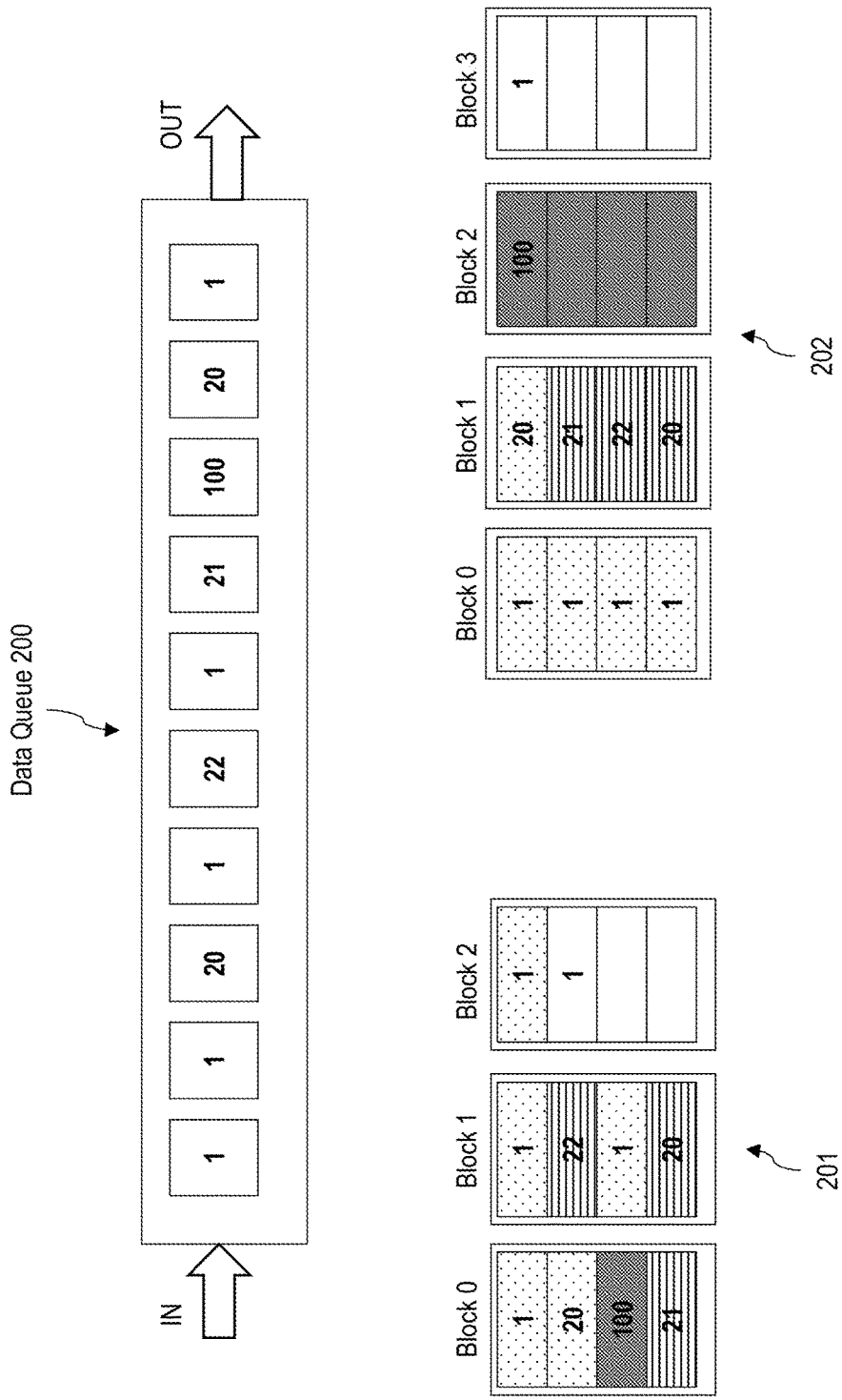
FIG. 2 illustrates an example of data placement, according to one embodiment.

FIG. 2 illustrates an example of data placement, according to one embodiment. The kernel or an application running on a host has data to write to a non-volatile memory. According to a conventional data placement scheme 201, the requested data are written to the non-volatile memory without a stream. Therefore, the requested data is written to the non-volatile memory in the order they are placed in a data queue 200. Accordingly, data of different characteristics can be written to the same memory blocks. For example, data 1 and 20 written to the memory block 0 may be invalidated data, and data 100 written to the memory block 0 is a multimedia data, and data 21 written to the memory block 0 may be user data.

According to the present multi-stream data placement scheme 202, the requested data is placed in the data queue 200, and placed in multiple streams based on the data characteristics. Data having the same or similar update frequency are streamed to the same memory blocks of the non-volatile memory. Some memory blocks may include a uniform data of the same data characteristics, while other memory blocks may include data of two or more different data characteristics. For example, invalidated data may be written to the memory block 0, user data 21, 22, and 20 may be written to the memory block 1, multimedia data 100 may be written to the memory block 2, and the user data 1 may be written to the memory block 3. The memory block 1 may include an invalidated data 20. When the user data 21, 22, and 20 are updated, trimmed, unmapped, or deallocated, the memory block 1 can be flushed along with the invalidated data 20.

Figure 3:
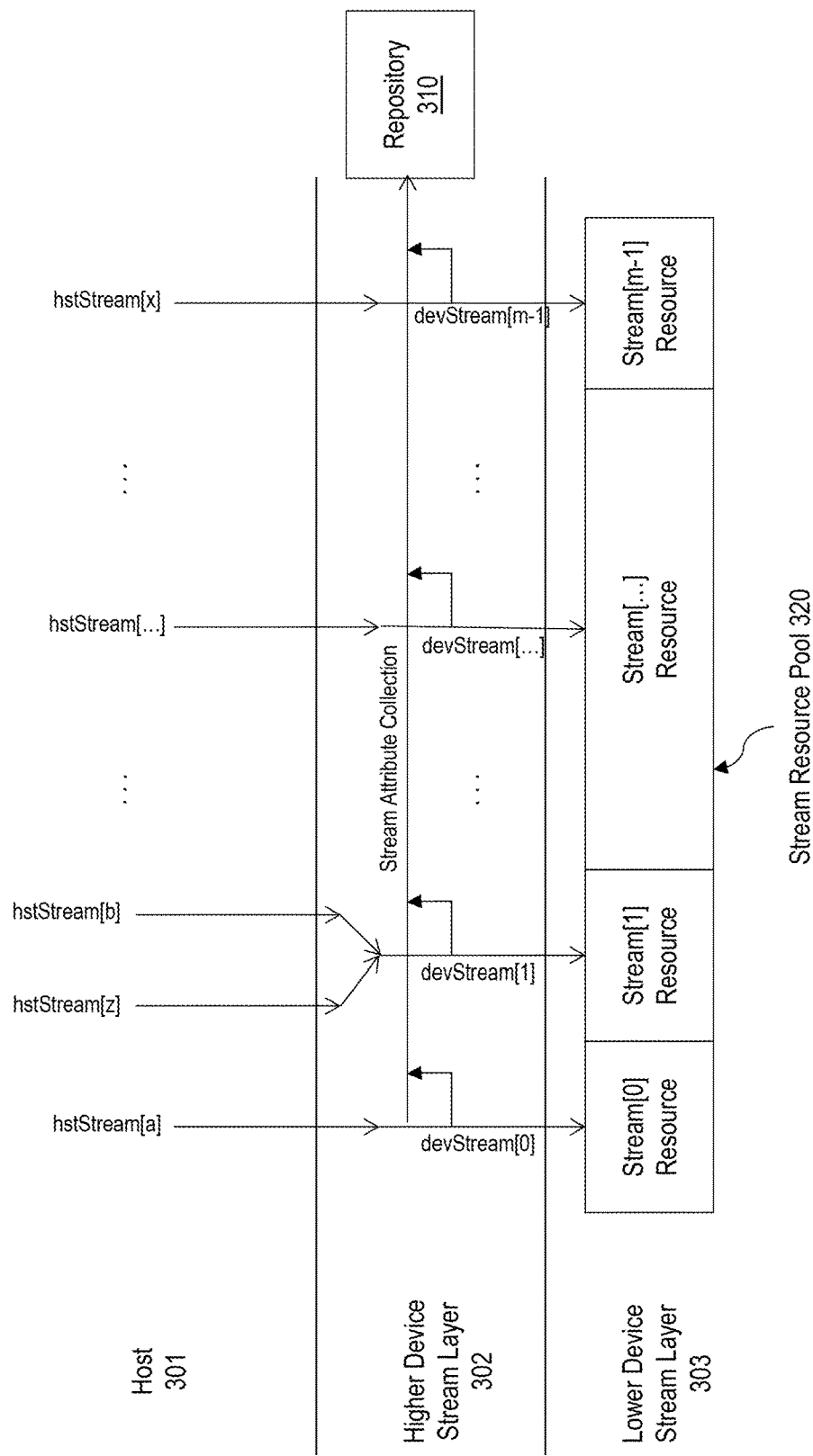
FIG. 3 illustrates a layered-architecture of an example multi-stream system, according to one embodiment.

FIG. 3 illustrates a layered-architecture of an example multi-stream system, according to one embodiment. A host (or a server) 301 issues a plurality of data access request to a non-volatile memory via multiple streams. The host or the non-volatile memory has a double-tiered stream layer including a higher device stream layer 302 and a lower device stream layer 303. Some of the streams issued by the host 301 can be merged into a single stream. The higher device stream layer 302 collects stream attributes. Examples of the stream attributes include, but are not limited to, a time stamp, an update frequency in a given time period, and an amount of data written to the stream.

The collected stream attributes are stored in a repository 310. The collected stream attributes stored in the repository 310 may be forwarded to the victim-stream selection logic that may be implemented in the host 301, in the non-volatile memory, or externally. The victim-stream selection logic refers to the stream attributes when selecting one or more victim streams. The higher device stream layer 302 can merge the streams received from the host 301 and generate device-level streams. Some of the streams issued by the host 301 can be directly translated into the corresponding device streams without performing a merge. In one embodiment, the stream resources in a stream resource pool 320 of the non-volatile memory are divided into m groups, where m is the number of the maximum allowable streams for the non-volatile memory. The device-level streams are allocated to the stream resources (e.g., the CPU and the memory) of the non-volatile memory in the stream resource pool 320 by the lower device stream layer 303.

The present victim-stream selection logic can select one or more victim streams among a plurality of streams in various manners. In each of the following examples, only one stream attribute is recorded in the repository 310. However, it is understood that more than one stream attributes can be recorded in the repository 310, and a combination of stream attributes can be considered when selecting a victim stream. In this case, each stream attribute can have a priority and be given a different weighting factor. A higher priority stream attribute is given a heavier weight when selecting the victim stream.

FIG. 4A is an example table of stream attributes including a time stamp, according to one embodiment. In this embodiment, a time stamp for each stream is recorded in a repository (e.g., repository 310 of FIG. 3) whenever the stream is accessed. When a host or the non-volatile memory needs to close a stream, a stream with the oldest time stamp will be selected as a victim stream to close. In the present example, five streams, Stream 1 to Stream 5, are currently open and used, and one stream needs to be closed. Stream 4 has the oldest time stamp that is 3. In this case, the smaller the time stamp, the older the stream is. Therefore, Stream 4 is selected as a victim stream. It is noted that the unit of the time stamp can be of any time unit, for example, the time of the day. In the present example, the time units shown in FIG. 4A is only an example and may be unit-less or a normalized time unit.

FIG. 4B is an example table of stream attributes including an update frequency, according to one embodiment. In this embodiment, an update frequency of each stream for a given time period is recorded in the repository. When a host or the non-volatile memory needs to close a stream, the least frequently used stream is selected to be closed. In the present example, five streams, Stream 1 to Stream 5, are currently open and used, and one stream needs to be closed. Stream 2 that is used 5 times for a given time period is the least frequently used stream. Therefore, Stream 2 is selected as a victim stream. It is noted that the time period in which the update frequency is recorded may be any time unit, for example, minutes, hours, or days.

FIG. 4C is an example table of stream attributes including an amount of data written to a stream, according to one embodiment. In this embodiment, the amount of data written to each stream is recorded in the repository. When a host or the non-volatile memory needs to close a stream, the stream that is mostly filled is selected to be closed. In the present example, five streams, Stream 1 to Stream 5, are currently open and used, and one stream needs to be closed. In the present example, the erase block size is 96 MB. Stream 4 that is filled with 95.5 MB data is the mostly filled stream. Therefore, Stream 4 is selected as a victim stream. It is noted that the data unit in which the update frequency is recorded may be any data unit, for example, kilobyte (KB) and megabyte (MB), etc.

According to another embodiment, the host or the non-volatile memory can select the leastly filled stream as a victim stream. In this case, the least filled stream may be the stream that has the maximum difference between used and unused spaces. A stream that has the nearly equal used and unused spaces may be ruled out as a victim stream.

According to one embodiment, a method includes: collecting a stream attribute associated with each of a plurality of streams to a non-volatile memory; storing the stream attribute in a repository; and selecting a victim stream among the plurality of streams based on the stream attribute. The stream attribute can be one or more of a time stamp, an updated frequency, and an amount of data written to each of the plurality of streams.

The stream attribute may be a time stamp, and the victim stream may have the oldest time stamp among the plurality of streams.

The stream attribute may be an update frequency, and the victim stream may be the least frequently used stream among the plurality of streams.

The stream attribute may be an amount of data written to the corresponding stream, and the victim stream may be the mostly filled stream that is filled with the largest amount of data.

The stream attribute is an amount of data written to the corresponding stream, and the victim stream is the leastly filled stream that is filled with the smallest amount of data.

The host may select the victim stream explicitly based on a stream identifier, and the host may instruct the non-volatile memory to close the victim stream identified by the stream identifier via the multi-stream interface.

The host may instruct the non-volatile memory to open a new stream, and the non-volatile memory may implicitly close the victim stream among the plurality of streams and open the new stream.

According to another embodiment, a memory system includes: a host; a non-volatile memory; a multi-stream interface configured to interface between the host and the non-volatile memory; and a victim-stream selection logic. The victim-stream selection logic is configured to: collect a stream attribute associated with each of a plurality of streams to the non-volatile memory; store the stream attribute in a repository; and select a victim stream among the plurality of streams based on the stream attribute.

The stream attribute may be a time stamp, and the victim stream may have the oldest time stamp among the plurality of streams.

The stream attribute may be an update frequency, and the victim stream may be the least frequently used stream among the plurality of streams.

The stream attribute may be an amount of data written to the corresponding stream, and the victim stream may be the mostly filled stream that is filled with the largest amount of data.

The host may select the victim stream explicitly based on a stream identifier, and the host may instruct the non-volatile memory to close the victim stream identified by the stream identifier via the multi-stream interface.

The host may include the victim-stream selection logic.

The host may instruct the non-volatile memory to open a new stream, and the non-volatile memory may implicitly close the victim stream among the plurality of streams and open the new stream.

The non-volatile memory may include the victim-stream selection logic.

The victim-stream selection logic may be external to the host or the non-volatile memory.

The above example embodiments have been described hereinabove to illustrate various embodiments of implementing a system and method for providing a system and method for selecting a victim stream among a plurality of streams to access a non-volatile memory. Various modifications and departures from the disclosed example embodiments will occur to those having ordinary skill in the art. The subject matter that is intended to be within the scope of the invention is set forth in the following claims.

What is claimed is:
1. A method comprising:
collecting a stream attribute associated with each of a plurality of streams to a non-volatile memory;
storing the stream attribute in a repository;
receiving a request to open a new stream or close a stream among the plurality of streams from a host;
selecting a victim stream among the plurality of streams based on the stream attribute; and
closing the victim stream according to the request from the host,
wherein the host streams data using one or more of the plurality of streams based on characteristics of the data,
wherein the non-volatile memory stores the data to one or more memory blocks based on the characteristics of the data, and
wherein the stream attribute of each of the plurality of the streams is associated with the characteristics of the data that is streamed using the each of the plurality of the streams.

2. The method of claim 1, wherein the stream attribute is a time stamp, and the victim stream has the oldest time stamp among the plurality of streams.

3. The method of claim 1, wherein the stream attribute is an update frequency, and the victim stream is the least frequently used stream among the plurality of streams.

4. The method of claim 1, wherein the stream attribute is an amount of data written to the corresponding stream, and the victim stream is the mostly filled stream that is filled with the largest amount of data.

5. The method of claim 1, wherein the stream attribute is an amount of data written to the corresponding stream, and the victim stream is the leastly filled stream that is filled with the smallest amount of data.

6. The method of claim 1, wherein the host selects the victim stream explicitly based on a stream identifier, and the non-volatile memory closes the victim stream identified by the stream identifier via a multi-stream interface.

7. The method of claim 1, wherein the non-volatile memory implicitly closes the victim stream among the plurality of streams and opens the new stream.

8. A memory system comprising:
a host;
a non-volatile memory;
a multi-stream interface configured to interface between the host and the non-volatile memory; and
a victim-stream selection logic configured to:
collect a stream attribute associated with each of a plurality of streams to the non-volatile memory;
store the stream attribute in a repository;
receive a request to open a new stream or close a stream among the plurality of streams from the host;
select a victim stream among the plurality of streams based on the stream attribute; and
close the victim stream according to the request from the host,
wherein the host streams data using one or more of the plurality of streams based on characteristics of the data,
wherein the non-volatile memory stores the data to one or more memory blocks based on the characteristics of the data, and
wherein the stream attribute of each of the plurality of the streams is associated with the characteristics of the data that is streamed using the each of the plurality of the streams.

9. The memory system of claim 8, wherein the stream attribute is a time stamp, and the victim stream has the oldest time stamp among the plurality of streams.

10. The memory system of claim 8, wherein the stream attribute is an update frequency, and the victim stream the least frequently used stream among the plurality of streams.

11. The memory system of claim 8, wherein the stream attribute is an amount of data written to the corresponding stream, and the victim stream is the mostly filled stream that filled with the largest amount of data.

12. The memory system of claim 8, wherein the stream attribute is an amount of data written to the corresponding stream, and the victim stream is the leastly filled stream that filled with the smallest amount of data.

13. The memory system of claim 8, wherein the host selects the victim stream explicitly based on a stream identifier, and the non-volatile memory closes the victim stream identified by the stream identifier via the multi-stream interface.

14. The memory system of claim 13, wherein the host includes the victim-stream selection logic.

15. The memory system of claim 8, wherein the non-volatile memory implicitly closes the victim stream among the plurality of streams and opens the new stream.

16. The memory system of claim 15, wherein the non-volatile memory includes the victim-stream selection logic.

17. The memory system of claim 8, wherein the victim-stream selection logic is external to the host or the non-volatile memory.

* * * * *